United States Patent
Jagani et al.

(10) Patent No.: US 11,655,263 B2
(45) Date of Patent: May 23, 2023

(54) PREPARATION OF ISOCYANATOSILANES

(71) Applicant: MOMENTIVE PERFORMANCE MATERIALS INC., Waterford, NY (US)

(72) Inventors: Venkata Sunil Jagani, Bangalore (IN); Srinivas Komati, Bangalore (IN); Vivek Khare, Navi Mumbai (IN)

(73) Assignee: Momentive Performance Materials Inc, Waterford, NY (US)

( * ) Notice: Subject to any disclaimer, the term of this patent is extended or adjusted under 35 U.S.C. 154(b) by 16 days.

(21) Appl. No.: 17/259,268

(22) PCT Filed: Jul. 2, 2019

(86) PCT No.: PCT/US2019/040262
§ 371 (c)(1),
(2) Date: Jan. 11, 2021

(87) PCT Pub. No.: WO2020/014040
PCT Pub. Date: Jan. 16, 2020

(65) Prior Publication Data
US 2021/0277035 A1    Sep. 9, 2021

Related U.S. Application Data

(60) Provisional application No. 62/697,564, filed on Jul. 13, 2018.

(51) Int. Cl.
*C07F 7/18* (2006.01)
*B01D 3/00* (2006.01)
(Continued)

(52) U.S. Cl.
CPC ............ *C07F 7/1892* (2013.01); *B01D 3/009* (2013.01); *B01D 3/143* (2013.01); *B01D 3/32* (2013.01)

(58) Field of Classification Search
None
See application file for complete search history.

(56) References Cited

U.S. PATENT DOCUMENTS

| 2,254,182 | A | * | 8/1941 | Kraft | ................. | B01D 3/4266 |
| | | | | | | 203/DIG. 19 |
| 5,393,910 | A | | 2/1995 | Mui et al. | | |

(Continued)

FOREIGN PATENT DOCUMENTS

| EP | 0649850 A1 | 4/1995 |
| EP | 0870769 A2 | 10/1998 |

OTHER PUBLICATIONS

International Search Report and Written Opinion from PCT/US2019/040262 dated Nov. 19, 2019.
(Continued)

*Primary Examiner* — Clinton A Brooks
(74) *Attorney, Agent, or Firm* — James C. Abruzzo

(57) ABSTRACT

There is provided herein a method and an apparatus for producing an isocyanatoorganosilane which method includes feeding a carbamatoorganosilane to a cracking device where it is thermally dissociated into a reaction product mixture comprising isocyanatoorganosilane, alcohol, and heavies, followed by separating the mixture in a distillation column of two parts and collecting the isocyanatoorganosilane from the distillation column via a side stream having a predetermined location between the top and bottom parts of the column; and wherein the distillation column is configured to have a ratio of the length of the bottom part of the distillation column to the length of the top part of the distillation column which is effective to provide a side stream having a high purity and high weight percent of isocyanatoorganosilane.

16 Claims, 2 Drawing Sheets

(51) Int. Cl.
   *B01D 3/14*      (2006.01)
   *B01D 3/32*      (2006.01)

(56)         References Cited

U.S. PATENT DOCUMENTS 5,731,458  A    3/1998   Dahmer et al.
   5,883,291  A    3/1999   Schleenstein et al.
   6,008,396  A   12/1999   Sheridan et al.
   6,388,117  B2   5/2002   Pinske
   6,812,361  B2  11/2004   Kammel et al.
   8,680,323  B2   3/2014   Bock et al.
   2002/0016486 A1 2/2002   Pinske
   2004/0049064 A1 3/2004   Kammel et al.

OTHER PUBLICATIONS

J.H. Saunders et al.: "Polyurethanes, Chemistry and Technology", 1962; 146-147 and 216-217.

* cited by examiner

COMPARATIVE

PREPARATION OF ISOCYANATOSILANES

CROSS-REFERENCE TO RELATED APPLICATIONS

This application claims priority to International Application No. PCT/US2019/040262, filed Jul. 2, 2019; which claims priority from U.S. Application Ser. No. 62/697,564, filed Jul. 13, 2018, the entire contents of which are incorporated herein by reference.

FIELD OF THE INVENTION

The invention is directed to methods of producing isocyanatosilanes, more specifically, producing the same employing thermal dissociation.

BACKGROUND OF THE INVENTION

Isocyanatosilanes are well-known silicon-containing materials which have long been used in the production of other silicon-containing products such as in the production of polyurethanes, e.g., polyurethanes used in the building and construction fields. Unfortunately, isocyanatosilanes tend to have a high manufacturing cost, which limits their potential applications. Various methods are known for preparing isocyanatosilanes, all of which suffer from drawbacks that result in a high cost or other undesired features of the produced isocyanatosilanes.

One currently used method is the thermal decomposition (cracking) of carbamatoorganosilanes, however, this method is inefficient as compared to its maximum possible theoretical yield, requires multiple steps, and produces undesirable high molecular weight byproducts such as allophanates and isocyanurate (trimer). To prevent the formation of such byproducts, isocyanate and alcohol(s) produced in the cracking reaction have to be rapidly removed. Another reason the isocyanate and alcohols have to be quickly removed is in order to prevent the reverse formation of the starting carbamate reactant from the dissociated carbamate reaction products.

There remains a desire in the industry for a process for the synthesis of isocyanatosilanes yielding the target molecules in high yield, without major by-products, such as isocyanurates or undesired high molecular weight species, as well as avoiding the reformation of starting carbamate.

SUMMARY OF THE INVENTION

In one non-limiting embodiment herein there is provided an improved method for making isocyanatoorganosilane in high yield, and high purity and with very limited formation of by-products. The high yield and/or high purity isocyanatoorganosilane product herein can be produced using the method and apparatus herein without the need for any additional purification such as further distillation.

There is provided herein a method for producing an isocyanatoorganosilane of the general formula (I)

comprising:
(A) feeding a carbamatoorganosilane of the general formula (II)

where
R is a monovalent alkyl radical containing from 1 to 10 carbon atoms or a monovalent aromatic group of from 6 to 12 carbon atoms,
$R^1$ is a divalent hydrocarbon radical containing from 1 to 6 carbon atoms, and $R^2$, $R^3$ and $R^4$ are independently selected from the group consisting of methyl, ethyl, n-propyl, isopropyl, methoxy, ethoxy, n-propoxy and isopropoxy radicals, to a cracking device, preferably located beneath a distillation column;
(B) heating the fed carbamatoorganosilane to a temperature and pressure effective to thermally dissociate the carbamatoorganosilane in the cracking device to a reaction product mixture comprising isocyanatoorganosilane, alcohol, unreacted carbamatoorganosilane, and heavies,
(C) separating isocyanatoorganosilane having a purity greater than 90% from the rest of the reaction product mixture in a distillation column having a bottom part and a top part, preferably by conveying the resulting vapors from the cracking device to the bottom part of the distillation column for said separation, and
(D) collecting the isocyanatoorganosilane having greater than 90% purity from a side stream; which is located between the bottom part of the distillation column and the top part of the distillation column and
wherein the ratio of the length of the bottom part of the distillation column to the length of the top part of the distillation column is from 2:1 to 10:1.

There is also provided herein a distillation column having a top part and a bottom part, wherein the top part has a top exit point and a bottom entrance/exit point and the bottom part has a top exit point and a bottom entrance/exit point, and wherein the ratio of the length of the bottom part of the distillation column to the length of the top part of the distillation column is from 2:1 to 10:1, and wherein a side exit point is located between the bottom part of the distillation column and the top part of the distillation column.

DETAILED DESCRIPTION OF THE INVENTION

Figure 1:
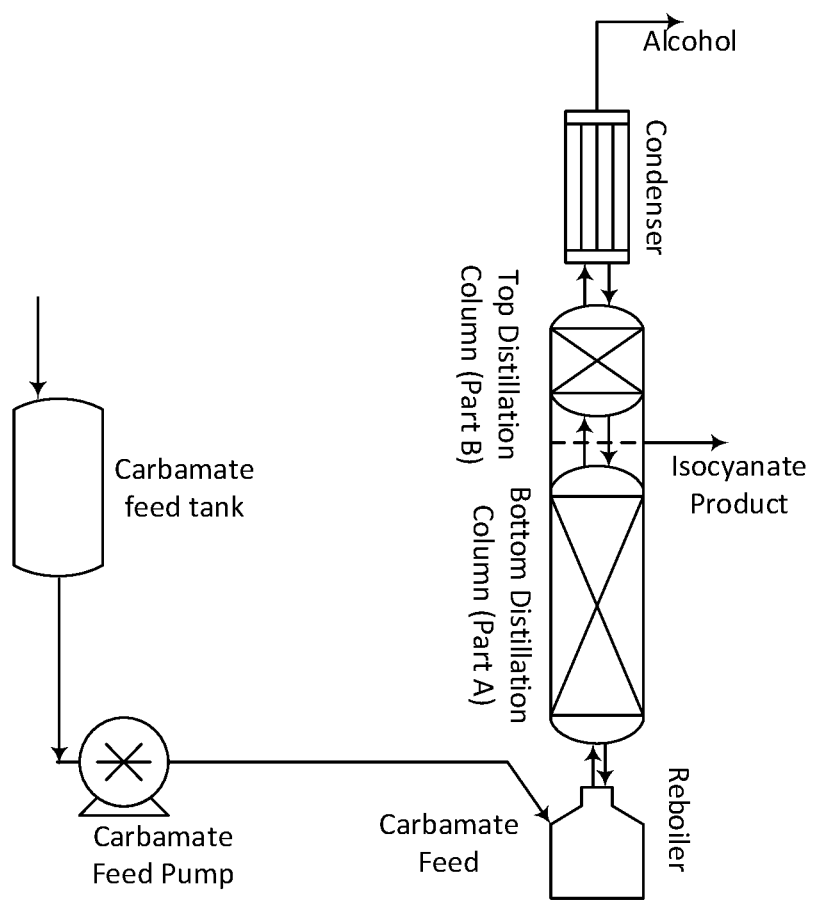
FIG. 1 is schematic diagram of the apparatus for employing the method of the present invention.

The present invention relates to an improved method and apparatus for preparing isocyanatoorganosilanes in a high yield, e.g., >60% and a high purity, e.g., >90%, with a significantly decreased level of undesired by-products such as isocyanurate, and which also is conducted in a single distillation system.

The expression "distillation system" as used herein will be understood to be one entity inclusive of a cracking device component, e.g., a reboiler, a distillation component and a condenser component. The distillation component can be a distillation column which has a top part and a bottom part. In one non-limiting embodiment the cracking device is a reboiler which is internal to the distillation component, however, preferably the cracking device is a reboiler which is external to the distillation component.

Other than in the working examples or where otherwise indicated, all numbers expressing amounts of materials, reaction conditions, time durations, quantified properties of materials, and so forth, stated in the specification and claims are to be understood as being modified in all instances by the term "about" whether or not the term "about" is used in the expression.

As used in the claims, the word "comprises" and its grammatical variants logically also subtend and include phrases of varying and differing extent such as for example, "consisting essentially of" and "consisting of".

It will be understood that any numerical range recited herein includes all sub-ranges within that range and any combination of the various endpoints of such ranges or sub-ranges, be it described in the examples or anywhere else in the specification.

It will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

It will be understood herein that in one non-limiting embodiment, any definition of any one or more of R, $R^1$, $R^2$, $R^3$ and $R^4$ can also have the same definition in any formulae that appear herein that contain such variables or subscripts.

As used herein the term "alkyl" means a monovalent saturated straight or branched hydrocarbon radical. In a preferred embodiment, alkyl groups are selected from linear or branched alkyl groups containing from 1 to 60 carbons per group, preferably 1 to 30 carbon atoms, more preferably 1 to 20 carbon atoms, even more preferably 1 to 20 carbon atoms, yet even more preferably 1 to 16 carbon atoms, and yet even more preferably 1 to 12 carbon atoms, or 1 to 8 carbon atoms or 1 to 6 carbon atoms, some non-limiting examples of such ranges being, for example, methyl, ethyl, n-propyl, iso-propyl, n-butyl, iso-butyl, sec-butyl, tert-butyl, pentyl, hexyl, heptyl, decyl, dodecyl.

In a non-limiting embodiment herein the method for the preparation of the isocyanatosilane of the general formula (I) is such that wherein the carbamatoorganosilane reactant of formula (II) is such that R is a monovalent hydrocarbon radical containing from 1 to 3 carbon atoms, preferably methyl, $R^1$ is a divalent hydrocarbon group containing from 1 to 3 carbon atoms, and more preferably 3 carbon atoms, and where each of $R^2$, $R^3$ and $R^4$ are independently selected from methyl, ethyl, methoxy and ethoxy radicals Preferably, the carbamatoorganosilane of the general formula (II) is selected from the group consisting of methyl N-(3-trimethoxysilypropyl) carbamate, ethyl N-(3-triethoxysilypropyl) carbamate and combinations thereof.

The isocyanatoorganosilane of the general formula (I) which is made by the method herein can be such that wherein $R^1$, $R^2$, $R^3$ and $R^4$ are as defined above.

In another embodiment herein the isocyanatoorganosilane of formula (I) produced in the method described herein is selected from the group consisting of 3-isocyanatopropyltrimethoxysilane, 3-isocyanatopropyltriethoxysilane, 2-isocyanato-1-methylethyltrimethoxysilane, 2-isocyanatopropyltrimethoxysilane, 4-isocyanatobutyltrimethoxysilane, 2-isocyanato-1,1-dimethylethyltrimethoxysilane, 3-isocyanatopropyltriethoxysilane, 2-isocyanato-1-methylethyltriethoxysilane, 2-isocyanatopropyltriethoxysilane, 4-isocyanatobutyltriethoxysilane, 2-isocyanato-1,1-dimethylethyltriethoxysilane, 3-isocyanatopropylmethyldimethoxysilane, 3-isocyanatopropyl-methyldiethoxysilane, 2-isocyanato-1-methylethylmethyldimethoxysilane, 2-isocyanatopropylmethyldimethoxysilane, and combinations thereof.

In an even more preferable embodiment herein isocyanatoorganosilane of formula (I) produced in the method described herein is selected from the group consisting of 3-isocyanatopropyltrimethoxysilane, 3-isocyanatopropyltriethoxysilane and combinations thereof.

As described above, in step (A) of the method herein, the carbamatoorganosilane of the general formula (II) is fed to the cracking device, as described further herein and below, wherein the carbamatoorganosilane is heated to a temperature and pressure effective to thermally dissociate the carbamatoorganosilane to a reaction product mixture comprising isocyanatoorganosilane, alcohol, unreacted carbamatoorganosilane, and heavies, such as the non-limiting examples of heavies of allophanates and isocyanurate (trimer).

The method herein can be conducted in a batch or continuous mode. In batch mode, the carbamatoorganosilane can be fed as pure carbamatoorganosilane or a mixture of carbamatoorganosilane and heavies, such as the non-limiting example of a mixture of trimer and multimers of carbamate or isocyanate). In another embodiment, fresh carbamatoorganosilane is fed continuously into a cracking device (which cracking device is part of the distillation system described herein) which is in one embodiment preferably located beneath the bottom of the distillation column and may be fed with the assistance of a feed pump in a manner as is known to those skilled in the art. In general, distillation columns are designed to operate in the feed rate range which will provide the desired product separation and recovery yield. As one of ordinary skill in the art would recognize, the flow rate of the carbamatoorganosilane fed to the distillation system will vary based on the design of the system. If the feed flow rate to the cracking device is lower than the design capacity, vapor can flow out from the column bottom. Low bottom levels can also cause cavitation and overheating of bottoms (heavies) withdrawal pump. Such operating condition may also cause the vapor flow rate in the distillation column to be too low. If the vapor flow in the distillation system is not sufficient, "column weeping" may occur which leads to distillation column inefficiency, reduced purity, and low recovery yield. If, on the other hand, the feed flow rate is higher than the design capacity, the system will overload, resulting in a flooding condition in the distillation column, where the vapor rising up the distillation column is impeded by the liquid flowing down the column. This also results in reduced column efficiency, reduced purity and low recovery yield.

The distillation columns suitable for the distillation component in the method and system herein can correspond to a conventional distillation column in one of many various forms, and may be very differently packed and designed. The distillation column may be filled with packing elements of various kinds, for example Raschig rings or cloth packs of metal or glass, or may contain separation plates, such as bubble plates. The distillation column merely has to lend itself to operation in such a way that the reaction product mixture comprising isocyanatoorganosilane, alcohol, unreacted carbamatoorganosilane, and heavies introduced into the distillation column can be uniformly dispersed and the gaseous/liquid products/high boilers can be removed from the distillation column as described herein. The side stream as described herein is removed from the distillation column at a predetermined location and is positioned between the bottom part of the distillation column and the top part of the distillation column. The mechanism used for removing the side stream is one known to those skilled in the art and is used in conventional distillation columns for removal of a liquid component therefrom, and the mechanism can control the flow of liquid from the distillation column.

In one embodiment of the invention, the cracking device may include, but not be limited to, a reboiler; an evaporator, such as a thin film, falling film, wiped film or short path evaporator; a fluidized-bed reactor; a fixed-bed reactor; a tube reactor; a gas-phase flow-through apparatus; and the like. In a preferred embodiment, the cracking device is a reboiler.

As described above, in step (B) of the method herein, the fed carbamatoorganosilane is heated to a temperature and pressure effective to thermally dissociate the carbamatoorganosilane. The temperature and pressure effective to thermally dissociate the carbamatoorganosilane which can be implemented in the cracking device can be determined by those skilled in the art and will depend on the specific carbamatoorganosilane and any heavies present in the cracking device or in the feed, but in general, such temperatures and pressures can range from about 150° C. to about 300° C., preferably from about 170° C. to about 250° C. and most preferably from about 195° C. to about 230° C., and a pressure at the head of the column of from about 2 to about 500 mbar, preferably from about 5 to about 120 mbar, and most preferably from about 45 to about 110 mbar.

In general, the bottom of the distillation column functions as a stripping section by separating isocyanatoorganosilane and high volatile components, e.g., alcohol(s) which are conveyed to the top of the distillation column as vapor, from low volatile components such as unreacted carbamatoorganosilane, and heavies, which low volatiles are condensed into liquid and returned to the cracking device. The reaction crude, i.e., the reaction product mixture formed from the thermal dissociation occurring in the cracking device is a mixture of components, some of which have a higher volatility than the product isocyanatoorganosilane and some of which have a lower volatility than the product isocyanatoorganosilane.

The cracking device can function to provide for the dissociation reaction of the carbamatosilane(s) into the isocyanatoorganosilane(s), alcohol(s) and heavies. The reaction conditions of the cracking device, e.g., the aforementioned temperature and pressure, can in one non-limiting embodiment, function to provide for the transfer of the isocyanatoorganosilane(s) and alcohol(s) out of the cracking device as a vapor up into the distillation column, and any unreacted carbamatosilane(s) and heavies that also enter the column are condensed and flow down to be removed from the bottom of the bottom part of the distillation column and returned to the cracking device. The condensed liquid exiting the bottom part of the distillation column has a minimal amount of isocyanatoorganosilane(s) which limits the formation of undesirable high molecular weight byproducts in the cracking device and results in a process with a high yield. As the vapor rises up through the distillation column and the liquid flows down, both phases (i.e., vapor and liquid) contact each other and heat and mass transfer occur between the liquid and vapor phases.

By selecting the aforementioned temperature in the cracking device and the pressure at the head of the distillation column, the selectivity for particular isocyanatoorganosilanes can be provided. For example, selectivity of lower molecular weight isocyanatoorganosilanes can be provided such as the non-limiting examples of 3-isocyanatopropyltrimethoxysilane, 3-isocyanatopropyltriethoxysilane, and combinations thereof.

Optionally, the cracking device can contain one or more catalysts, such as catalysts commonly known to those skilled in the art of carbamate cracking, for example homogenous and/or heterogeneous catalysts. Suitable solid catalysts include acidic ion-exchange resins, mixed metal oxides (e.g., silica-alumina), acidic zeolites, acidic clays, and mixtures thereof, which may include Amberlyst A-15, Amberlyst A-35, Amberlyst A-36 (available from Rohm & Haas Company), Purolite® C-275 (available from Purolite Corporation), and Dowex® 50 (available from Dow Chemical Company). Typical catalysts for this method include aluminum, titanium, magnesium and zirconium alkoxides such as aluminum triethoxide which in an embodiment is preferred and tin carboxylates such as dibutyltin dilaurate, dibutyltin diacetate and stannous octoate which in an embodiment are preferred and the like. Other examples of catalysts can include, but are not limited to, ammonium formate, ammonium acetate, ammonium propanoate, ammonium n-butanoate, ammonium n-pentanoate, ammonium 2-methylpropanoate, ammonium 3-methylbutanoate (valerate), ammonium benzoate, tetramethylammonium acetate, tetraethylammonium acetate, tetrabutylammonium acetate, tetramethylammonium 2-ethylhexanoate, tetraethylammonium 2-ethylhexanoate, tetramethylammonium benzoate, tetraethylammonium benzoate, tetrapropylammonium benzoate, tetrabutylammonium benzoate, and the like, calcium, magnesium and barium carboxylates derived from formic acid, acetic acid, propanoic acid, n-butanoic acid, and the like.

In addition, the cracking device can contain a liquid or solid solvent to facilitate the prevention of the reverse reaction of reforming the reactant carbamate. While the particular solvent chosen may be selected depending on the carbamate being fed and the particular reaction conditions, in one non-limiting embodiment the solvent can be a solvent at the pressure in the cracking device having a boiling point of at least 10° C., preferably at least 40° C. above the boiling points of the isocyanatoorganosilanes and alcohol reaction products of the dissociation of the carbamatoorganosilane.

Some non-limiting examples of suitable solvents include but are not limited to linear and branched alkanes such as the octanes, nonanes decanes, dodecanes, tetradecanes and hexadecanes and combinations thereof. The aromatics and alkylated aromatics such as ortho-xylene, meta-xylene, para-xylene mixtures of two or more of the xylenes, ethylbenzene, cumene, diisopropylbenzenes, dibutylbenzenes, dodecylbenzenes, naphthalene, biphenyl, tetralin, substituted benzenes non-reactive with isocyanates such as the nitro or halogenated compounds for example, the chlorobenzenes, nitrobenzenes and the like, substituted naphthalenes non-reactive with isocyanates such as the nitro or halogenated compounds for example, the chloronaphthalenes, nitronaphthlanes and the like may be used. Likewise cycloaliphatic hydrocarbons such as decalin may be used as the solvent. Ethers such as triethylene glycol dimethyl ether, tetraethylene glycol dimethyl ether, tripropylene glycol dimethyl ether, tetrapropylene glycol dimethyl ether, dibenzyl ether. Particularly useful are the heat transfer fluids which are commercially available through various sources with tradenames such as Therminol, Dowtherm, Marlotherm, and Nalkylene.

As described above, in step (C) of the method herein, the isocyanatoorganosilane having a purity greater than or equal to about 90%, and as described elsewhere herein, can be separated from the rest of the reaction product mixture in the thermal dissociation of the carbamatoorganosilane in the distillation column. Further as described above, in step (D) of the method herein, the isocyanatoorganosilane so separated in step (C) has a high purity of greater than or equal to about 90% and is collected through a side stream which is located between the bottom part of the distillation column and the top part of the distillation column.

The top part of the distillation column functions as an enriching or rectifying section by separating isocyanatoorganosilane which is condensed into the liquid phase and returns to and is collected in the side stream, or side stream take-off stream, described herein, from high volatiles such as alcohol(s), which alcohol(s) exit the top of the distillation column in the vapor phase, through the use of a partial condenser. The partial condenser is preferably located above the top part of the distillation column to remove alcohol(s) from the vapor mixture present from step (C) therein, and wherein the partial condenser condenses the isocyanatoorganosilane into the liquid phase which liquid phase is then reintroduced into the top part of the distillation column in order to provide the separated isocyanatoorganosilane having a purity greater than or equal to about 90%, or a purity as described elsewhere herein. In an embodiment herein, the alcohol(s) are not recycled back to the cracking device and are collected in a separate collection vessel. In accordance with step (D) of the method herein, the separated isocyanatoorganosilane can be continuously collected from the side stream at the exit point of the bottom part of the distillation column. It will be understood herein in one embodiment that the exit of the bottom part of the distillation column is immediately adjacent to the entrance of the top part, i.e., is immediately below the entrance to the top part.

Total reflux is the operating condition where vapor and liquid are passing each other in the distillation column but no product is removed. The method and apparatus herein can be operated in a near total reflux condition with the partial condenser above the top part of the distillation column and the side stream take off in between the top and bottom parts of the distillation column, preferably located at the exit point of the bottom part of the distillation column. In one embodiment herein, as was done in the experimental section herein, the distillate collection port valve was closed to ensure total condensed material in the partial condenser and reflux splitter position is returned to the top column The choice of the location of the side stream as described herein was unexpectedly discovered to be important to producing an exit vapor stream from the bottom part of the distillation column which has a minimal amount of carbamate and very high amounts of isocyanatoorganosilane(s) e.g., 0.6 to 0.8 kg/kg of feed, alcohol(s) and other high volatiles. The side stream take-off rate of high purity isocyanatoorganosilane described herein is provided such that the method, apparatus and system described is operated in a hydrodynamically stable condition, i.e., the take-off rate is such that it does not result in trays drying due to very low liquid or no liquid flow in the distillation system.

In an embodiment herein, the ratio of the length of the bottom part of the distillation column to the length of the top part of the distillation column is from about 2:1 to about 10:1, preferably from about 3:1 to about 8:1, more preferably from about 3:1 to about 7:1, and most preferably from about 3:1 to about 5:1.

It is important to separate the isocyanatoorganosilane(s) from the alcohol(s) so as to prevent the reaction of these components together to reform the starting carbamatoorganosilane(s). The use of the top part of the single distillation column of the present invention to separate these components is one of the factors which leads to the improved purity of isocyanatoorganosilane obtained from the method and apparatus herein.

In one embodiment herein the isocyanatoorganosilane made by the method described herein can have a purity of greater than 90%, preferably greater than 92%, or preferably from about 90 to about 99.9%, and more preferably from about 90% to about 99% based on the total weight of the reaction product, immediately following the reaction and without any purification step(s).

In another embodiment, the isocyanatoorganosilane made by the method described herein can be in the substantial absence of an isocyanurate byproduct concentration, such as in an amount of less than 10% and more specifically, less than 5%, and most specifically less than 1% based on the weight of the reaction product as determined immediately after the production of the isocyanatoorganosilane or at a period of at about 5 days thereafter.

In yet another embodiment herein the yield of isocyanatoorganosilane collected in step (D) of the method herein can be greater than 60%, preferably greater than 65% based on the weight of collected isocyanatoorganosilane relative to the weight of fed carbamatoorganosilane. In another embodiment, the yield of isocyanatoorganosilane collected in step (D) of the method herein can be from about 60% to about 80% and more preferably from about 60% to about 75%, based on the weight of collected isocyanatoorganosilane relative to the weight of fed carbamatoorganosilane.

In one embodiment herein, the distillation system as described herein can comprise the apparatus as illustrated in the FIG. 1 and as articulated in the method described herein. The parts of the apparatus as employed in the method herein correspond to the same in the distillation system as described herein. Therefore, for example, the distillation system as described above and herein must comprise the partial condenser as described above for the method and apparatus and can be located above the top part of the distillation column component and connected thereto through the top exit point. The system must comprise a cracking device, which preferably is below the bottom part of the distillation column and connected thereto through the bottom entrance exit point.

In one embodiment herein the method, apparatus and system described herein, e.g., one having the herein described side stream take off located between the top part and lower part of the distillation column, preferably at the exit point of the bottom part of the column, and/or employing the ratio of the length of the bottom part to the length of the top part of the distillation column, can provide for higher purity and/or higher yield as compared to a column not of the present invention which has a take-off at the top of the distillation column and/or does not have the herein recited ratio of length of the bottom to the top of the distillation column.

EXAMPLES

Experiments conducted with varying length of Bottom Distillation Column (Part A) (as shown in FIG. 1) to identify the optimal location of side stream take-off as a product withdrawal point to give high purity 3-isocyanatopropyltrimethoxysilane are summarized in Table 1. It can be seen from the results that optimal length of the Bottom Distillation Column (Part A) is necessary to get high purity 3-isocyanatopropyltrimethoxysilane as a product (Example 3 in Table 1).

Experiments performed in continuous mode with column length ratio between Part A and Part B of 3, as shown in FIG. 1, are summarized in Table 2. In these experiments methyl N-(3-trimethoxysilylpropyl) carbamate was thermally dissociated to give 3-isocyanatopropyltrimethoxysilane which was separated by distillation.

In continuous mode of operation (as shown in FIG. 1) the system was operated for around 6 h. The continuous operation results are also included in Table 2 and the results indicate better yields and purity than the comparative experiments conducted without side-stream take-off, which are provided below.

Figure 2:
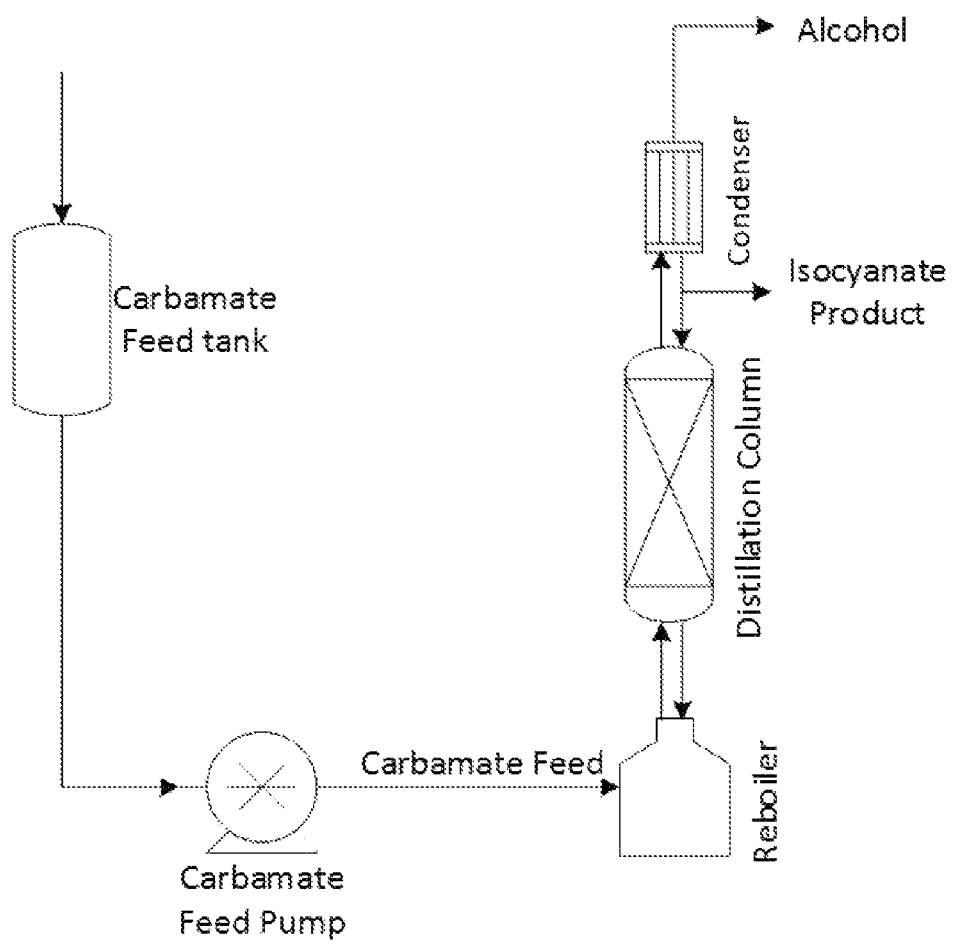
FIG. 2 is a schematic diagram of the apparatus of a comparative apparatus.

The system was modified for operation in a mode without using a side-stream take-off and the results of these Comparative Examples are also included in Table 2. In this comparative mode of operation a product side-stream was not collected between the top part of the distillation column and the bottom part of the distillation column. Instead the liquid product stream of 3-isocyanatopropyltrimethoxysilane was collected from the bottom of the partial condenser as a distillate and the by-product methanol and other high volatiles were removed from the top of the partial condenser as shown in FIG. 2. It can be seen that when starting with the same (or similar) feed composition the inventive continuous process gives 3-isocyanatopropyltrimethoxysilane with higher purity and in higher yield (see Example 6 vs. Comparative Example 1, and Example 5 vs. Comparative Example 2 in Table 2).

TABLE 1

Cracking Results with Different Side Stream Location

| Example no. | Feed Composition | Column length (cm) | | Ratio (length Part A/ length Part B) | Product Purity in Side Stream (% w/w) |
| | | Part A | Part B | | |
| --- | --- | --- | --- | --- | --- |
| 1 | Component A: 0<br>Component B: 98<br>Component C: 0<br>Others: 2 | 20 | 20 | 1:1 | 40 |
| 2 | Component A: 0<br>Component B: 98<br>Component C: 0<br>Others: 2 | 40 | 20 | 2:1 | 51 |
| 3 | Component A: 0<br>Component B: 98<br>Component C: 0<br>Others: 2 | 60 | 20 | 3:1 | 98 |

TABLE 2

Carbamate Cracking Results

| Example no. | Feed Composition | Product Purity in Side Stream/ Distillate (% w/w) | Product Yield (% w/w) † | Reboiler Temperature (° C.) | Column Head Pressure (mbar) |
| --- | --- | --- | --- | --- | --- |
| 4 | Component A: 1.4<br>Component B: 78<br>Component C: 18<br>Others: 1.6 | Component A: 92 | 62 | 204 | 105-106 |
| 5 | Component A: 0<br>Component B: 73<br>Component C: 25<br>Others: 2 | Component A: 98 | 70 | 202 | 102-110 |
| 6 | Component A: 0<br>Component B: 98<br>Component C: 0<br>Others: 2 | Component A: 97 | 69 | 198 | 102-103 |
| Comparative Examples | | | | | |
| 1 | Component A: 0<br>Component B: 98<br>Component C: 0<br>Others: 2 | Component A: 90 | 57 | 208 | 103-104 |

TABLE 2-continued

Carbamate Cracking Results

| Example no. | Feed Composition | Product Purity in Side Stream/ Distillate (% w/w) | Product Yield (% w/w) † | Reboiler Temperature (° C.) | Column Head Pressure (mbar) |
|---|---|---|---|---|---|
| 2 | Component A: 0 Component B: 73 Component C: 22 Others: 5 | Component A: 90 | 47 | 206 | 103-104 |

† Product yield is weight of collected isocyanatoorganosilane relative to the weight of fed carbamatoorganosilane
Examples 1-3, column length ratio of Part A (bottom part): Part B (top part) was 3:1.
*Represents the results for experiments conducted without side stream product take off for comparison
Component A: 3-isocyanatopropyltrimethoxysilane
Component B: methyl N-(3-trimethoxysilypropyl) carbamate
Component C: 1,3,5-tris[3-(trimethoxysilyl)propyl] isocyanurate ("trimer")

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

The invention claimed is:

1. A method for producing a high purity isocyanatoorganosilane of the general formula (I)

$$R^2R^3R^4Si-R^1-N=C=O \quad (I),$$

comprising:
(A) feeding a carbamatoorganosilane of the general formula (II)

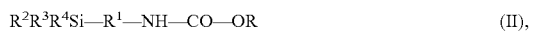

$$R^2R^3R^4Si-R^1-NH-CO-OR \quad (II),$$

where
R is a monovalent alkyl radical containing from 1 to 10 carbon atoms or an aromatic group of from 6 to 12 carbon atoms,
$R^1$ is a divalent hydrocarbon radical containing from 1 to about 6 carbon atoms, and $R^2$, $R^3$ and $R^4$ are independently selected from the group consisting of methyl, ethyl, n-propyl, isopropyl, methoxy, ethoxy, n-propoxy and isopropoxy radicals, to a cracking device;
(B) heating the fed carbamatoorganosilane to a temperature and pressure effective to thermally dissociate the carbamatoorganosilane to a reaction product mixture comprising isocyanatoorganosilane, alcohol, unreacted carbamatoorganosilane, and heavies,
(C) separating isocyanatoorganosilane having a purity greater than about 90% from the rest of the reaction product mixture in a distillation column having a bottom part and a top part by conveying the isocyanatoorganosilane and alcohol in the reaction mixture of step (B) as a vapor mixture to the top part of the distillation column and removing the alcohol from the vapor mixture and condensing the isocyanatoorganosilane into the liquid phase by a partial condenser positioned above the top part of the distillation column, and reintroducing the liquid phase into the top part of the distillation column to provide the separated isocyanatoorganosilane having a purity greater than about 90%, and
(D) collecting the isocyanatoorganosilane having greater than about 90% purity through a side stream which is located between the bottom part of the distillation column and the top part of the distillation column and wherein the ratio of the length of the bottom part of the distillation column to the length of the top part of the distillation column is from 2:1 to about 10:1.

2. The method of claim 1, wherein the ratio of the bottom part of the distillation column to the length of the top part of the distillation column is from about 3:1 to about 5:1.

3. The method of claim 1, where the method is a continuous method.

4. The method of claim 1, where the carbamatoorganosilane is such that R is a monovalent alkyl radical containing from 1 to about 3 carbon atoms, $R^1$ is a divalent hydrocarbon radical containing from 1 to about 3 carbon atoms, and $R^2$, $R^3$ and $R^4$ are independently selected from the group consisting of methyl, ethyl, methoxy, and ethoxy radicals.

5. The method of claim 1, where the carbamatoorganosilane is selected from the group consisting of methyl N-(3-trimethoxysilypropyl) carbamate, ethyl N-(3-triethoxysilypropyl) carbamate and combinations thereof.

6. The method of claim 1 wherein the temperature and pressure effective to thermally dissociate the carbamatoorganosilane are from about 150° C. to about 300° C. and from about 2 to about 500 mbar.

7. The method of claim 1, where the isocyanatoorganosilane is selected from the group consisting of 3-isocyanatopropyltrimethoxysilane, 3-isocyanatopropyltriethoxysilane and combinations thereof.

8. The method of claim 1, wherein step (B) further comprises employing a catalyst.

9. The method of claim 1 wherein step (B) further comprises adding a solvent to the cracking device.

10. The method of claim 1, further comprising removing the heavies from the cracking device.

11. The method of claim 1, wherein the purity of the isocyanatoorganosilane which is separated in step (C) and collected in step (D) is greater than about 92%.

12. The method of claim 1, wherein the yield of isocyanatoorganosilane collected in step (D) is greater than or equal to about 60% based on the weight of collected isocyanatoorganosilane relative to the weight of fed carbamatoorganosilane.

13. The method of claim 1, wherein the yield of isocyanatoorganosilane collected in step (D) is greater than or equal to about 65% based on the weight of collected isocyanatoorganosilane relative to the weight of fed carbamatoorganosilane.

14. The method of claim 1, wherein the side stream of step (D) is located at an exit point from the bottom part of the distillation column.

15. The method of claim 1, wherein the isocyanatoorganosilane having greater than about 90% purity which is collected through a side stream in step (D) is removed from the distillation column at a rate that provides for a hydrodynamically stable system.

16. The method of claim 1, wherein the distillation column is a single distillation column.

* * * * *